United States Patent
Solondz et al.

(10) Patent No.: US 6,314,305 B1
(45) Date of Patent: Nov. 6, 2001

(54) TRANSMITTER/RECEIVER FOR COMBINED ADAPTIVE ARRAY PROCESSING AND FIXED BEAM SWITCHING

(75) Inventors: Max Solondz, Morris Township; Roger D. Benning, Long Valley, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/208,766

(22) Filed: Dec. 10, 1998

(51) Int. Cl.[7] .................................................. H04B 1/50
(52) U.S. Cl. ........................ 455/562; 455/78; 455/83; 455/138; 342/373
(58) Field of Search .............................. 455/562, 507, 455/422, 517, 561, 67.1, 67.3, 63, 138, 273, 450–453, 456, 132–137, 269, 272, 277.1, 78, 83; 375/267, 299, 347; 342/155, 373.457; 343/702, 893

(56) References Cited

U.S. PATENT DOCUMENTS

| | | | |
|---|---|---|---|
| 5,551,060 | * 8/1996 | Fujii et al. | 455/562 |
| 5,596,333 | * 1/1997 | Bruckert | 455/277.1 |
| 5,615,409 | 3/1997 | Forssén et al. | |
| 5,636,242 | 6/1997 | Tsujimoto | |
| 5,745,858 | 4/1998 | Sato et al. | |
| 5,778,324 | 7/1998 | Smith | |
| 6,173,014 | * 1/2001 | Forssen et al. | 455/132 |
| 6,188,914 | * 2/2001 | Chheda | 455/562 |

* cited by examiner

Primary Examiner—Lester G. Kincaid
(74) Attorney, Agent, or Firm—Dickstein Shapiro Morin & Oshinsky LLP

(57) ABSTRACT

A cellular base station transmitter/receiver system is provided which combines adaptive array processing, for the uplink RF signals, and fixed beam switching, for the downlink RF signals. An example of the configuration employs at least four antenna ports, with all four ports being used to provide uplink RF signals to a receiver processor, two being used to supply narrow beam uplink signals and two being used to supply wide beam uplink signals. Two of the four ports are used to provide beam switched narrow beam downlink RF signals.

46 Claims, 7 Drawing Sheets

US 6,314,305 B1

TRANSMITTER/RECEIVER FOR COMBINED ADAPTIVE ARRAY PROCESSING AND FIXED BEAM SWITCHING

BACKGROUND OF THE INVENTION

1. Field of the Invention

The present invention relates to a cellular communications base station that combines adaptive array processing and fixed beam switching within a common antenna set and within a common array.

2. Description of the Related Art

The cellular industry has enjoyed phenomenal growth in the United States and the rest of the world. In a cellular system, large geographical areas are divided into cells. At the center of each cell is a base station. The base station is the one common location within the cell through which all mobile units communicate, therefore, it is extremely important that there be sufficiently strong signals for both the uplink (base station receive) and the downlink (base station transmit) signal paths.

Each cell is also often further divided into sectors. Typically, three or six sector configurations are employed. In a typical three sector cell, each sector covers a 120 degree wide radius of the cell.

Current wireless base station receivers use two branch antenna diversity for the uplink and a single antenna for the downlink. Many systems, however, are now migrating to adaptive antenna array processing for the uplink, as well as to four branch antenna receiver systems.

It should be noted that inasmuch as any given antenna beam pattern (e.g., such as that depicted in FIG. 1) is achievable with many different antenna element configurations using different numbers of antenna elements, the invention will be described with reference to antenna ports which are the common input and output nodes connected to an antenna configuration, the latter of which is capable of transmitting or receiving signals using a particular antenna beam pattern.

FIG. 1 depicts a conventional beam pattern for an adaptive antenna array. It is well understood in the art that adaptive antenna arrays are optimal for a receiver uplink as they increase a receiver's effective sensitivity. This can be achieved by increasing the number of separate branches used in diversity processing and/or by increasing the number of antenna elements that are combined together in order to achieve array gain. In FIG. 1, four concurrent sector beams 10a, 10b, 10c, 10d are shown. It is well known in the art that optimum performance is achieved when the sector of interest is covered by n separate antennas, where each one of n antennas concurrently covers the entire sector. Therefore, while FIG. 1 depicts the use of four concurrent beams, respectively associated with four antenna ports, any number of antenna ports, and correspondingly, any number of concurrent beams may be used in order to practice conventional adaptive array processing.

With reference to FIG. 2, a block diagram for a conventional adaptive array receiver is shown. Each of four antenna ports 20a, 20b, 20c 20d, one for each FIG. 1 beam, is coupled to a respective one of four adaptive array/diversity receiver branches 22a, 22b, 22c, 22d.

Each of the receiver branches 22a, 22b, 22c, 22d is further coupled to an adaptive array processor 25. Typically, the adaptive array processor 25 will perform an adaptive array algorithm in which signals from the receiver branches 22a, 22b, 22c, 22d are weighted against each other to determine relative signal strengths. The spectrum of relative strengths can run between the two extremes of severe Rayleigh fading, where signals received on all ports 20a, 20b, 20c, 20d are of very different amplitude levels, and no Rayleigh fading, where all of the signals received from all four antenna ports 20a, 20b, 20c, 20d are of substantially equal amplitude. Those receiver branches with the strongest uplink signals are weighted more heavily in the array processor 25 in order to increase the effective signal-to-noise ratio of the final result which is then passed through for processing by the receiver 26.

Referring now to FIG. 3, a conventional beam pattern for a switched fixed multi-beam array (hereinafter "fixed beam switching") is shown. As is well known in the art, fixed beam switching is desirable for a downlink (i.e., base station transmit).

FIG. 3 shows four sub-sector beams 30a, 30b, 30c, 30d which form a transmit antenna array beam pattern. As is well known in the art, the transmitter array performs more optimally if energy can be steered into a narrow beam pointing in the direction of interest. This is achieved by smaller, more compact antenna arrays allowing λ/2 spacing between antenna elements whereby a cell sector is divided into a number of smaller sub-sectors thus allowing for the transmitter to form well defined, tightly controlled beams with no lobing effects. While FIG. 3 shows four sub-sector beams 30a, 30b, 30c, 30d, it should be well understood that a given sector may contain any number of sub-sector beams.

Referring now to FIG. 4, a block diagram for a conventional beam switching transmitter is shown. A transmitter signal source 40 is coupled to a transmit switch 41 which selects from one of four lines 41a, 41b, 41c, 41d. Each of the lines 41a, 41b, 41c, 41d is coupled to a transmitter 44. The transmitter 44 is coupled to a beamformer network 46, the composition of which is well known in the art. The beamformer 46 is coupled to each of four antenna ports 47a, 47b, 47c, 47d. One of the antenna ports 47a, 47b, 47c, 47d at a time is selected by switch 41 to serve the downlink function and transmit RF signals from a cellular base station.

As the state of the art currently exists, the use of two separate arrays of beam patterns (e.g., an array of concurrent beams for the uplink function, and an array of sub-sector beams for the downlink function) requires a very complex cellular base station signal processing system because the signal processing for the two separate arrays is also separate. Therefore, the transmitter must decide which sub-sector beam(s) it will radiate without the benefit of any positional information gathered by the receiver during the uplink function. That is to say, little has been done to simplify the downlink function, up to this point, other than simple sub-sectorization of the downlink beams.

While the use of sub-sectorization for the downlink function provides for near optimum transmission of the RF signals, there is currently no efficient way to process the uplink RF signals in such a way as to further optimize the downlink function, through fixed beam switching, in a cost effective way.

SUMMARY OF THE INVENTION

The present invention provides a transmitter/receiver system which interactively combines adaptive array processing, favored for the uplink, and fixed beam switching, favored for the downlink. This is achieved by combining both concurrent beam patterns and sub-sector beam patterns for the passage of uplink RF signals followed by the processing of the received RF signals. The transmitter/receiver system of the invention then decides through which of the available sub-sector beams it will radiate downlink RF signals to a mobile unit.

The transmitter/receiver system of the invention combines both types of distinct beam patterns (i.e., concurrent whole sector beams, and sub-sector beams) in such a way as to allow adequate spatial separation for the uplink function. As is well known in art, spatial separation is required for adequate beam independence in diversity processing of uplink RF signals. The transmitter/receiver system of the invention also allows for sub-sector beam patterns to be employed for the transmission of downlink RF signals.

The invention provides a transmitter/receiver system which uses at least four antenna ports, each associated with a respective antenna configuration which has an associated one of a full sector beam and a sub-sector beam. The at least four antenna ports, with simple cabling and simple duplexing, are employed in the transmitter/receiver system of the invention to support both adaptive array processing for the uplink and fixed beam switching for the downlink with some of the ports being used, with frequency duplexers, for both transmit and receive functions. That is to say, the transmitter/receiver system of the invention economically and efficiently combines both adaptive array processing and fixed beam switching in a single base station.

BRIEF DESCRIPTION OF THE DRAWINGS

These and other advantages and features of the invention will be more clearly understood from the following detailed description of the invention which is provided in connection with the accompanying drawings in which.

DETAILED DESCRIPTION OF PREFERRED EMBODIMENTS

Preferred embodiments of the present invention will now be described with reference to FIGS. 5–12. Other embodiments may be realized and structural, or logical changes may be made to the disclosed embodiments without departing from the spirit or scope of the present invention.

Figure 5:
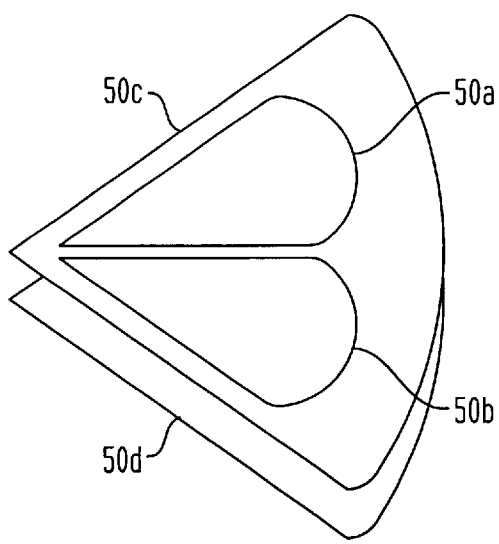
FIG. 5 illustrates a beam pattern used in a first embodiment of the present invention.

FIG. 5 depicts one of the many sector beam patterns which can be implemented with a first embodiment of the present invention. In this case, the sector of interest is nominally 120 degrees wide, covering one-third of a conventional three sector cellular base station. The sector uses four antenna ports, with two of the four antenna ports being connected with antennas having sub-sector beam patterns $50a$, $50b$. These two sub-sector beam patterns $50a$, $50b$ are non-overlapping and are frequency duplexed, as described later, to enable them to serve both receiver and transmitter functions. The two sub-sector beam patterns $50a$, $50b$ are designed to have narrower half-power beamwidths in order to achieve more gain within each sub-sector.

A second two of the four antenna ports are connected with respective antennas which have concurrent full sector beam patterns $50c$, $50d$. Each of the concurrent beam patterns $50c$, $50d$ cover the entire sector's field of view and thus have less antenna gain than the antennas associated with sub-sector beam patterns $50a$, $50b$. The transmitter/receiver system of the invention uses all four beam patterns for the uplink base station receive function. This feature allows the receiver to attain optimized reception sensitivity via multibranch diversity processing using all four reception beams $50a$, $50b$, $50c$, $50d$, while permitting the transmitter to use sub-sector beam selection using beam patterns $50a$, $50b$; the latter of which is described in more detail below.

Figure 6:
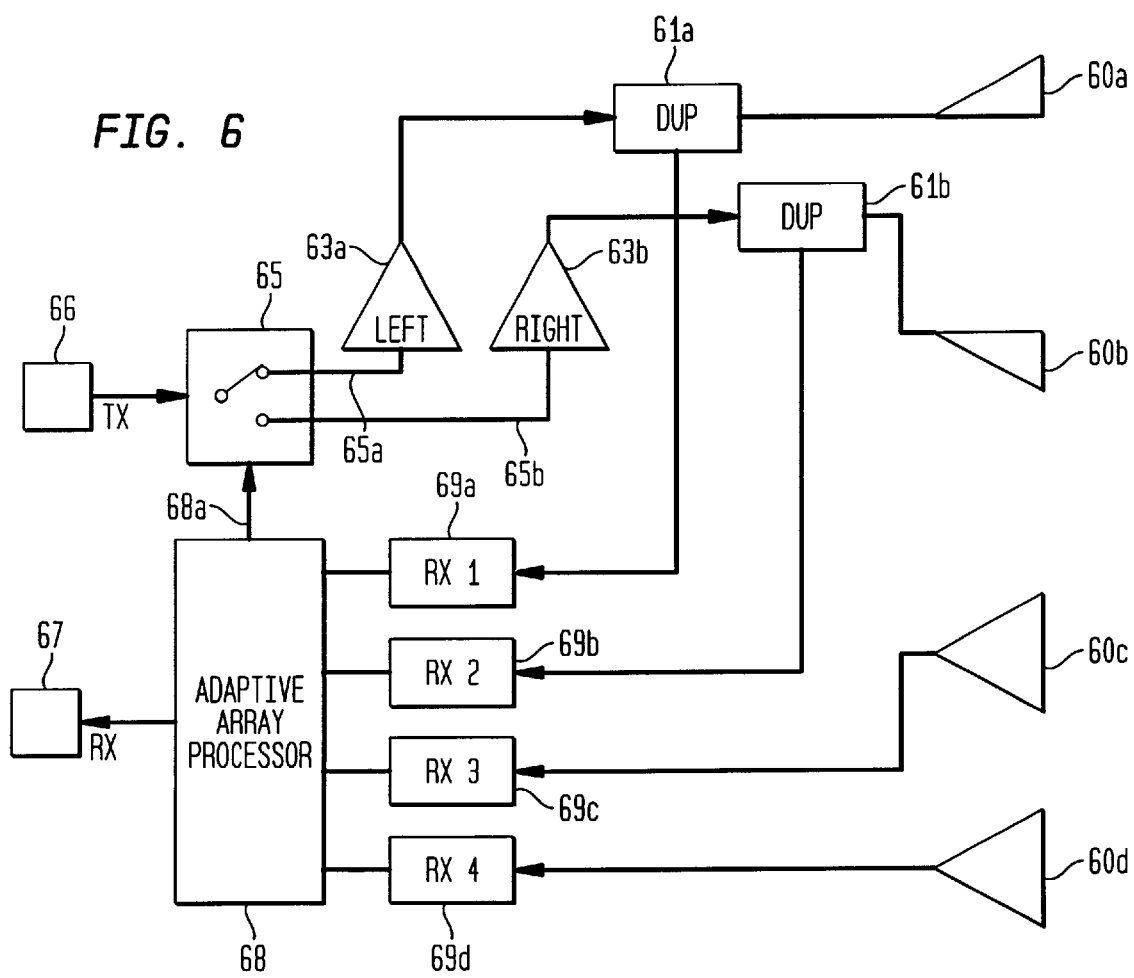
FIG. 6 illustrates a block diagram of a transmitter/receiver system in the first embodiment of the invention which utilizes the beam patterns of FIG. 5.

Referring now to FIG. 6, a block diagram of a transmitter/receiver system which utilizes the beam patterns of FIG. 5 is shown. Antenna ports $60a$, $60b$ serve to provide RF signals to respective antennas which produce the two sub-sector beam patterns for the downlink ($50a$, $50b$ in FIG. 5). These same two ports $60a$, $60b$ also serve to receive uplink RF signals, as well, in that uplink signals are provided through ports $60a$, $60b$ to receiver processing circuitry described below. This is achieved, in part, with frequency duplexers $61a$, $61b$ to which antenna ports $60a$, $60b$ are coupled. These frequency duplexers allow the same beam patterns $50a$, $50b$ (in FIG. 5) to serve both the uplink function and the downlink function on different frequencies within which the receiving function and the transmitting function operate.

Still referring to FIG. 6, antenna ports $60c$, $60d$ are connected to reception antennas, respectively, which receive RF signals using the beam patterns $50c$ and $50d$ of FIG. 5. Ports $60c$, $60d$ are also coupled to the first two branches $69c$, $69d$ of a four branch adaptive array/diversity receiver which includes four receiver branches $69a$, $69b$, $69c$, $69d$, an adaptive array processor 68 and a receiver 67. When antenna ports $60a$, $60b$ are serving the uplink, their respective signals are fed into frequency duplexers $61a$, $61b$, and from there to a second two branches $69a$, $69b$ of the four branch adaptive array/diversity receiver.

Figure 1:
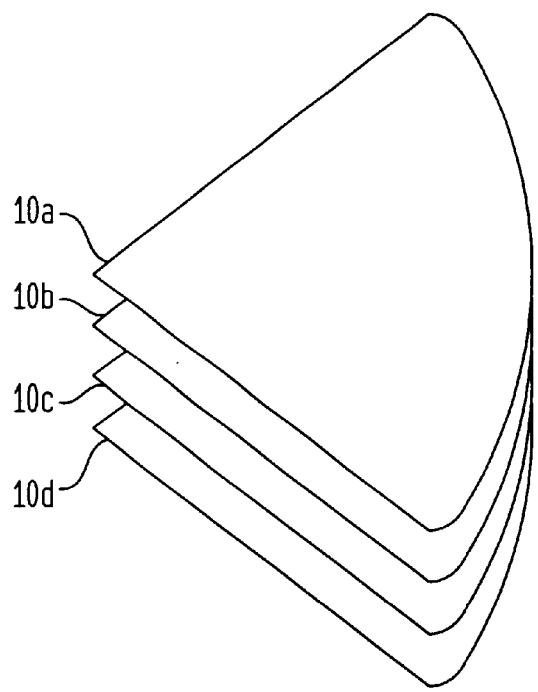
FIG. 1 illustrates a conventional beam pattern for an adaptive array within a sector containing four antenna ports and, wherein, each of the four antenna ports receive signals which cover an entire sector.
Figure 2:
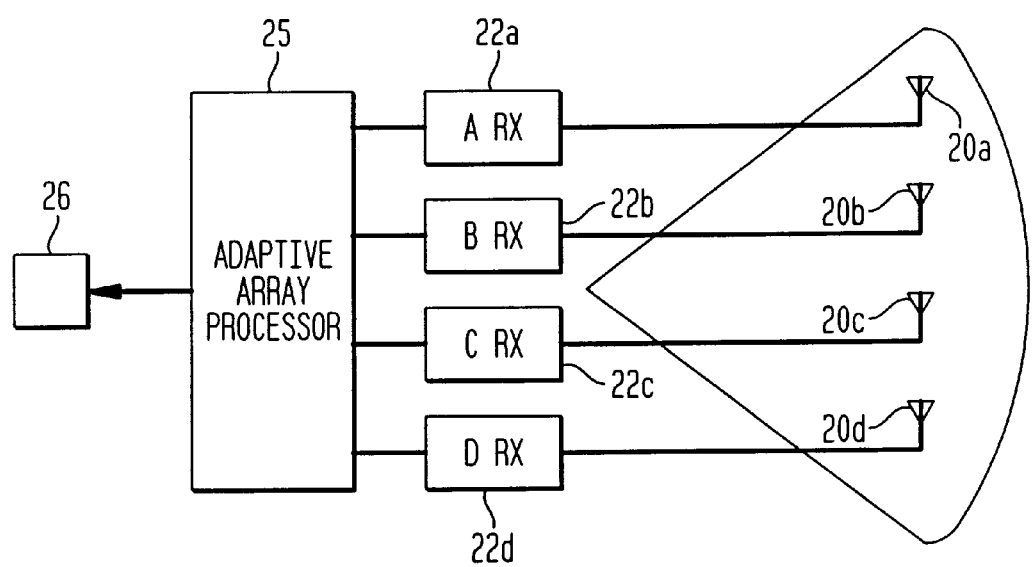
FIG. 2 illustrates a block diagram for an adaptive array receiver which utilizes the beam pattern of FIG. 1.
Figure 3:
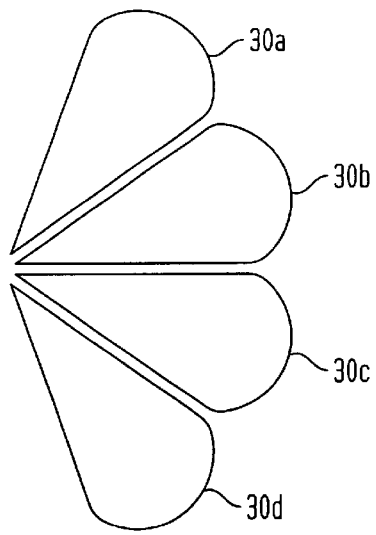
FIG. 3 illustrates a conventional beam pattern for a switched fixed multi-beam antenna array.
Figure 4:
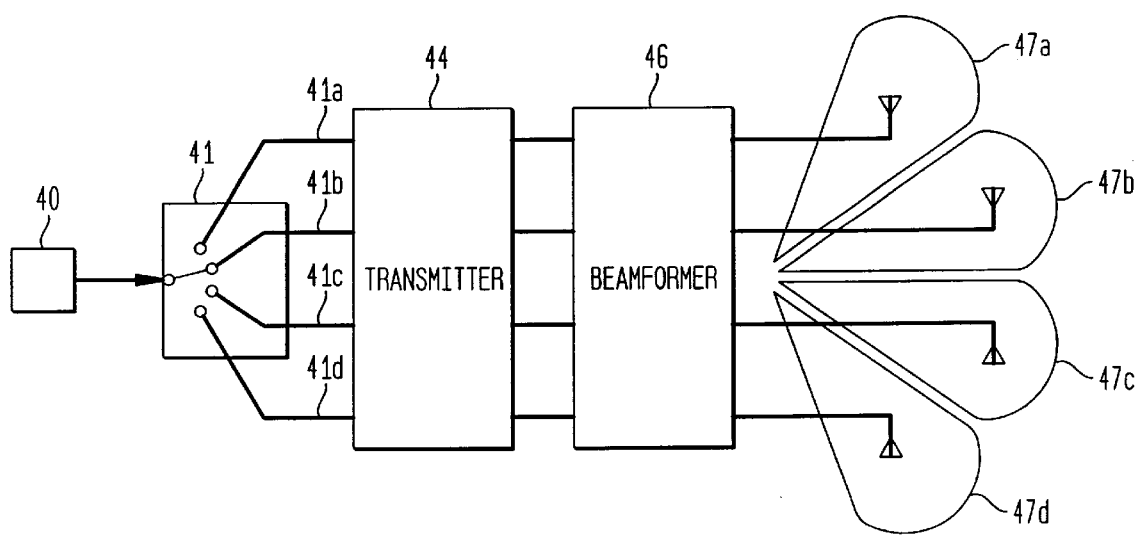
FIG. 4 illustrates a block diagram for a switched fixed multi-beam transmitter which utilizes the beam pattern of FIG. 3.

The signals received by the four receiver branches of the receiver $69a$, $69b$, $69c$, $69d$ are fed into adaptive array processor 68, wherein antenna signals from all four ports $60a$, $60b$, $60c$, $60d$ are processed using conventional adaptive array processing techniques. Although signals from the combination of antenna ports $60a$, $60b$ yields less diversity gain than those from the combination of antenna ports $60c$, 60*d*, antenna ports 60*a*, 60*b* have approximately 3dB more raw antenna gain. The net reception performance of the FIG. 6 system is better than a three branch diversity receiver covering the fill sector since one of the two beams 60*a*, 60*b* will capture energy from a mobile unit at a higher gain value, however, the performance will be less than that of a fill four branch adaptive array such as shown in FIG. 1. After the antenna signals are processed, in adaptive array processor 68, the final resulting antenna signal is sent to the receiver 67 for signal processing/demodulation.

The use of sub-sector beam patterns 50*a*, 50*b* (of FIG. 5) have the additional advantage of allowing the processor 68 a simple method for determining whether the transmitter should use the left beam 50*a* or the right beam 50*b* for the downlink transmit function. That is to say, a simple averaged magnitude comparison of the uplink RF signals received at ports 60*a*, 60*b* shows which sub-sector a mobile transceiver is in and thus determines which sub-sector beam pattern 50*a* or 50*b* is appropriate for transmission. It should be readily apparent that other methods may be used by the processor 68 to determine a transmit sub-sector beam for the downlink, based upon information derived from the uplink.

Still referring to FIG. 6, the transmitter 66 is coupled to selector switch 65. Selector switch 65 is also coupled to amplifiers 63*a*, 63*b* by RF signal paths 65*a*, 65*b*, respectively, for the left beam pattern 50*a* and the right beam pattern 50*b*, which are, in turn, coupled to the frequency duplexers 61*a*, 61*b*, and ports 60*a*, 60*b*, respectively. Once the processor 68 decides which sub-sector beam pattern will serve the downlink, it sends a signal to selector switch 65 via signal line 68*a*. Once the selector switch 65 receives the selection signal, it selects the appropriate beam pattern 50*a*, 50*b* and associated port 60*a*, 60*b* for transmission of the downlink RF signals.

Switch 65 can also be arranged so that transmitter 66 can simultaneously radiate an RF signal using both beam patterns 50*a*, 50*b*, thereby covering the entire sector using both ports 60*a*, 60*b* simultaneously instead of using a single port at a time. It should be noted that because of the increased antenna gain realized within each of the narrower sub-sector beam patterns 50*a*, 50*b*, a 3 dB power improvement, over radiating through only a single port, 60*a* or 60*b*, is yielded for the radiation of downlink RF signals.

The switched sub-sector beam pattern technique is more sophisticated, as it requires that mobile units be tracked, and if a time division multiple access (TDMA) system is used, this tracking and switching must be done on a time slot by time slot basis. However, since the transmitter 66 power is radiated on either the left beam 50*a* or the right beam 50*b*, a more efficient use of energy is achieved as only one sub-sector beam is being transmitted at any given time.

As should be readily apparent, the beam patterns 50*a*, 50*b*, 50*c*, 50*d* used in the first embodiment of the invention are not limited to those shown in FIG. 5. For instance, the sector width may be varied to encompass more or less than 120 degrees. In addition, higher order systems, such as those depicted in FIGS. 7 and 9, employing two, or more, concurrent whole sector beams for the uplink, while simultaneously employing two, or more, sub-sector beams to serve both the uplink and the downlink, can easily be achieved with only slight modifications.

Figure 7:
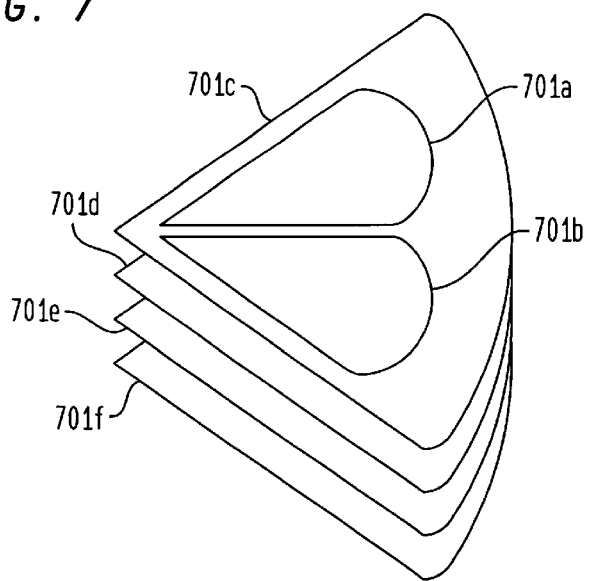
FIG. 7 illustrates a higher order beam pattern used in a second embodiment of the invention.

FIG. 7 depicts one such higher order transmitter/receiver system in which four concurrent whole sector beam patterns 701*c*, 701*d*, 701*e*, 701*f* serve the uplink, while two sub-sector beam patterns 701*a*, 701*b* serve both the uplink, during base station receive, and the downlink, during base station transmit.

Figure 8:
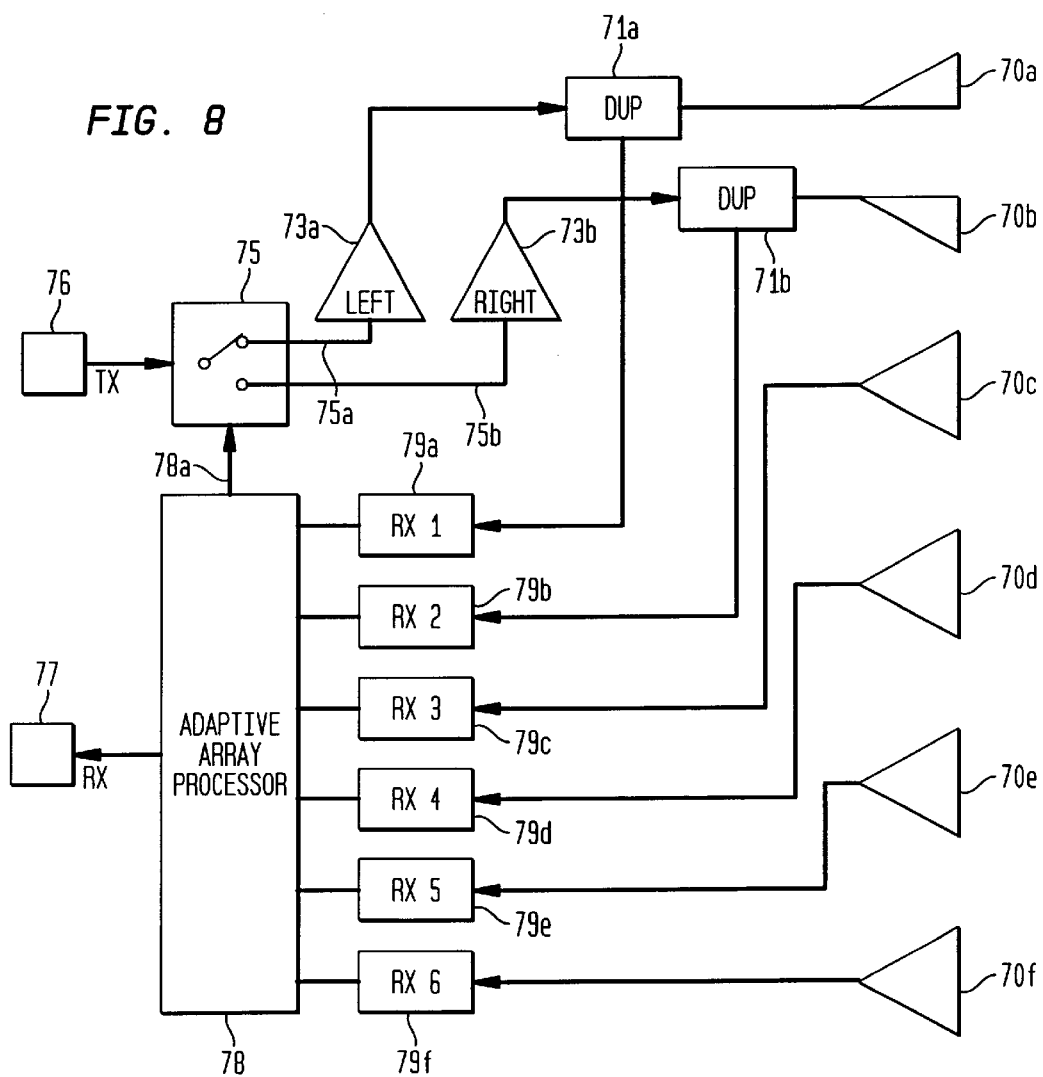
FIG. 8 illustrates a block diagram of a transmitter/receiver system in the second embodiment of the invention which utilizes the beam pattern of FIG. 7.

The FIG. 7 higher order beam patterns are achieved with a transmitter/receiver system in a second embodiment of the invention shown in the block diagram of FIG. 8. As can be readily seen, the FIG. 8 block diagram differs from the FIG. 6 block diagram only inasmuch as there are two additional antenna ports 70*e*, 70*f* serving the uplink. The two additional antenna ports 70*e*, 70*f* are coupled to two branches 79*e*, 79*f* of a six branch adaptive array/diversity receiver. The six branches 79*a*, 79*b*, 79*c*, 79*d*, 79*e*, 79*f* of the adaptive array/diversity receiver are then coupled to an adaptive array processor 78 (similar to that of FIG. 6). In all other respects, the FIG. 8 block diagram, and its operation, is identical to that previously described with respect to FIG. 6.

Figure 9:
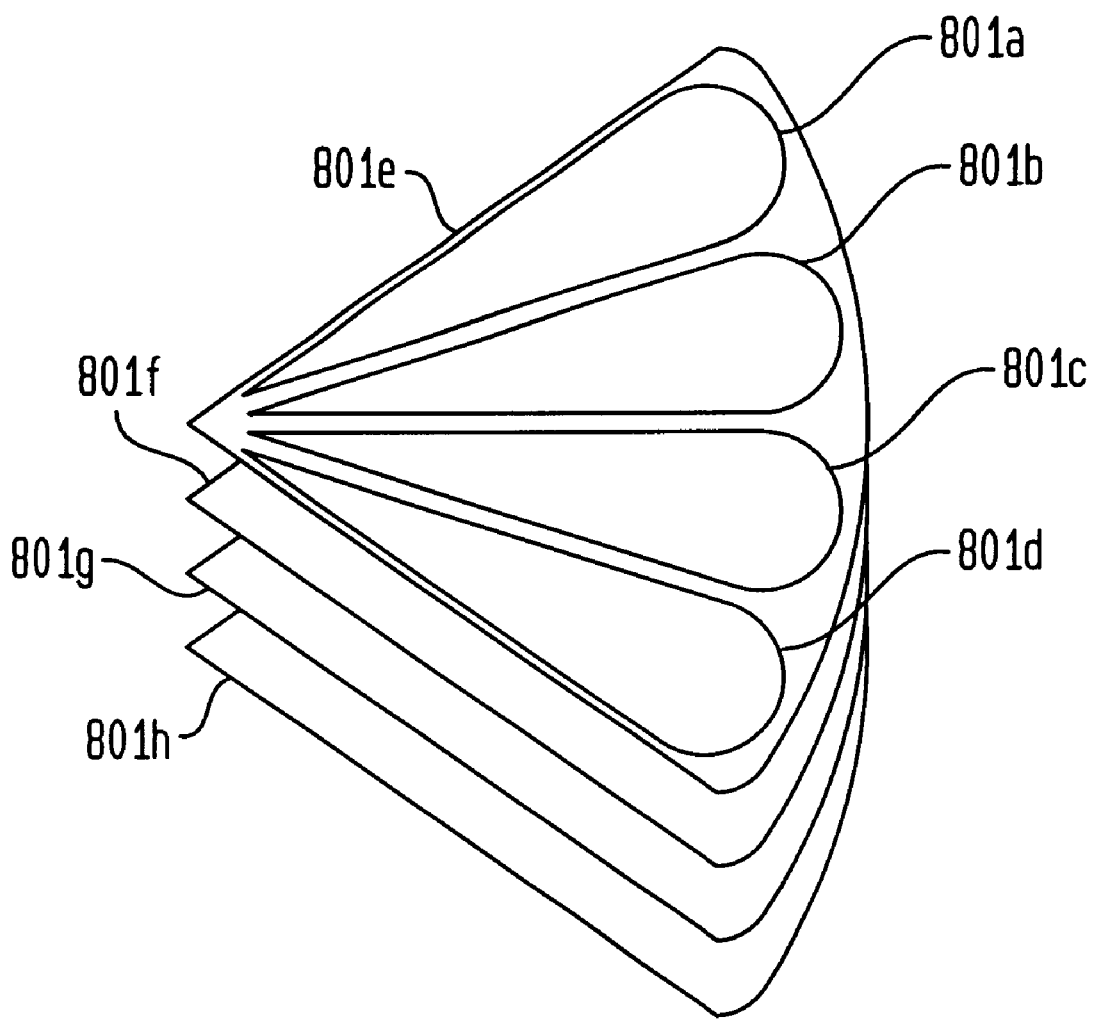
FIG. 9 illustrates a higher order beam pattern used in a third embodiment of the invention.

Similarly, FIG. 9 depicts a higher order system in which four concurrent whole sector beam patterns 801*e*, 801*f*, 801*g*, 801*h* serve the uplink, while four sub-sector beam patterns 801*a*, 801*b*, 801*c*, 801*d* serve both the uplink, during base station receive, and the downlink, during base station transmit.

Figure 10:
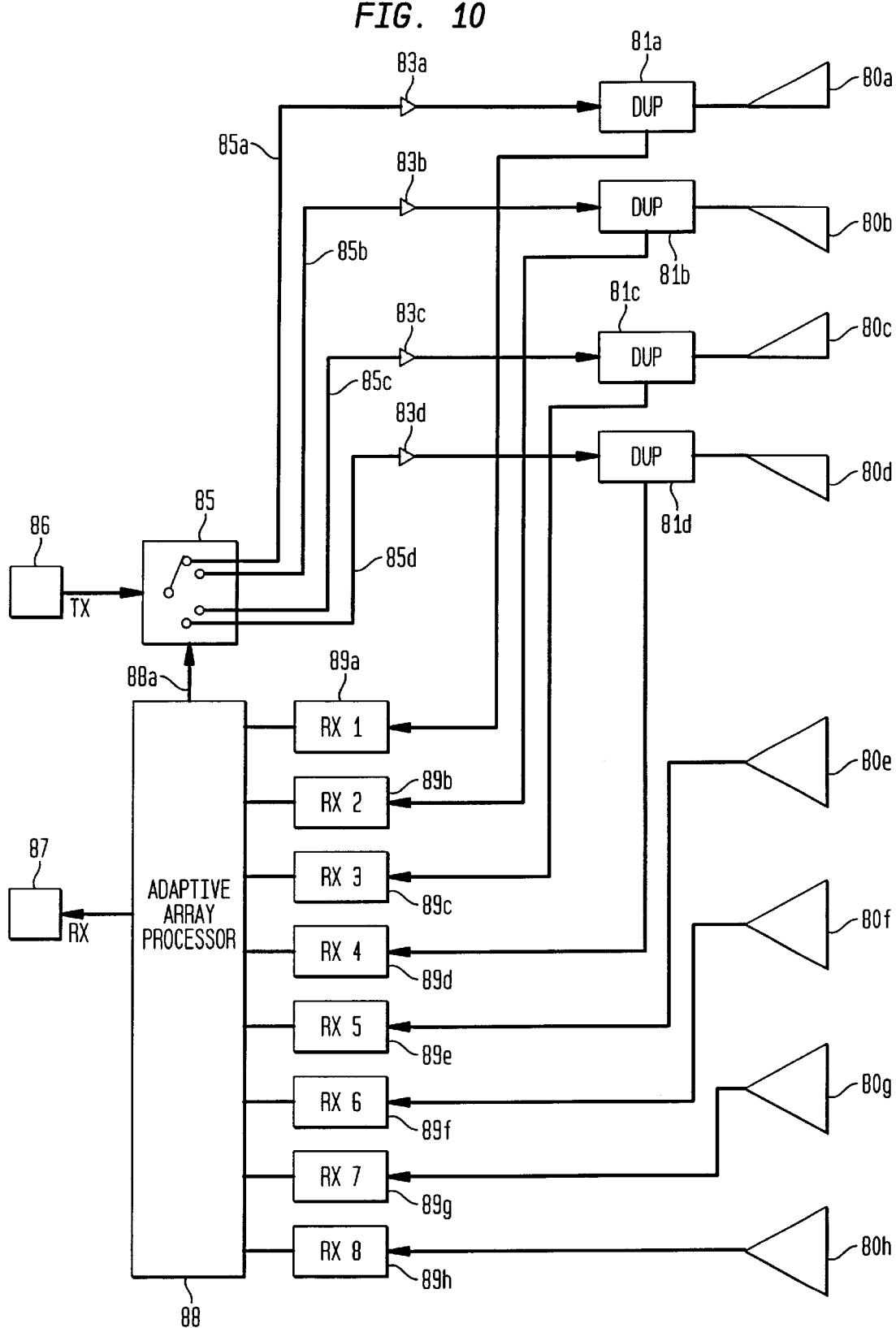
FIG. 10 illustrates a block diagram of a transmitter/receiver system in a third embodiment of the invention which utilizes the beam pattern of FIG. 9.

The FIG. 9 higher order beam patterns are achieved with a transmitter/receiver system in a third embodiment of the invention shown in the block diagram of FIG. 10. As can be readily seen, the FIG. 10 block diagram differs from the FIG. 8 block diagram in several respects. First, there are two additional antenna ports serving the sub-sector beams, for a total of four ports 80*a*, 80*b*, 80*c*, 80*d* serving the respective sub-sector beam patterns 801*a*, 801*b*, 801*c*, 801*d* (in FIG. 9). The FIG. 10 block diagram depicts four antenna ports 80*e*, 80*f*, 80*g*, 80*h* serving the concurrent beam patterns 801*e*, 801*f*, 801*g*, 801*h* (in FIG. 9). Thus, there are, in total, eight antenna ports 80*a*, 80*b*, 80*c*, 80*d*, 80*e*, 80*f*, 80*g*, 80*h* employed in the third embodiment of the invention. Each of these eight antenna ports 80*a*, 80*b*, 80*c*, 80*d*, 80*e*, 80*f*, 80*g*, 80*h* are coupled to a respective branch 89*a*, 89*b*, 89*c*, 89*d*, 89*e*, 89*f*, 89*g*, 89*h* of an eight branch adaptive array/diversity receiver. The eight branches of the receiver 89*a*, 89*b*, 89*c*, 89*d*, 89*e*, 89*f*, 89*g*, 89*h* are then coupled to an adaptive array processor 88.

The FIG. 10 block diagram also depicts two additional frequency duplexers for a total of four frequency duplexers 81*a*, 81*b*, 81*c*, 81*d*. Each of the frequency duplexers 81*a*, 81*b*, 81*c*, 81*d* has an output coupled to an output of a respective one of ports 80*a*, 80*b*, 80*c*, 80*d* and an input coupled to the output of a respective amplifier 83*a*, 83*b*, 83*c*, 83*d*. The amplifiers are coupled to respective outputs of a four position selector switch 85 by four RF signal paths 85*a*, 85*b*, 85*c*, 85*d*, respectively. In all other respects, the FIG. 10 block diagram, and its operation, is similar to that previously described for FIG. 8. In this embodiment, the array processor 88 provides an output signal on signal path 88*a* which selects one of the switch 85 outputs for use in downlink transmission based on the strength of the signals received on channels 89*a*, 89*b*, 89*c* and 89*d* at the array processor 88 during uplink signal processing.

Figure 11:
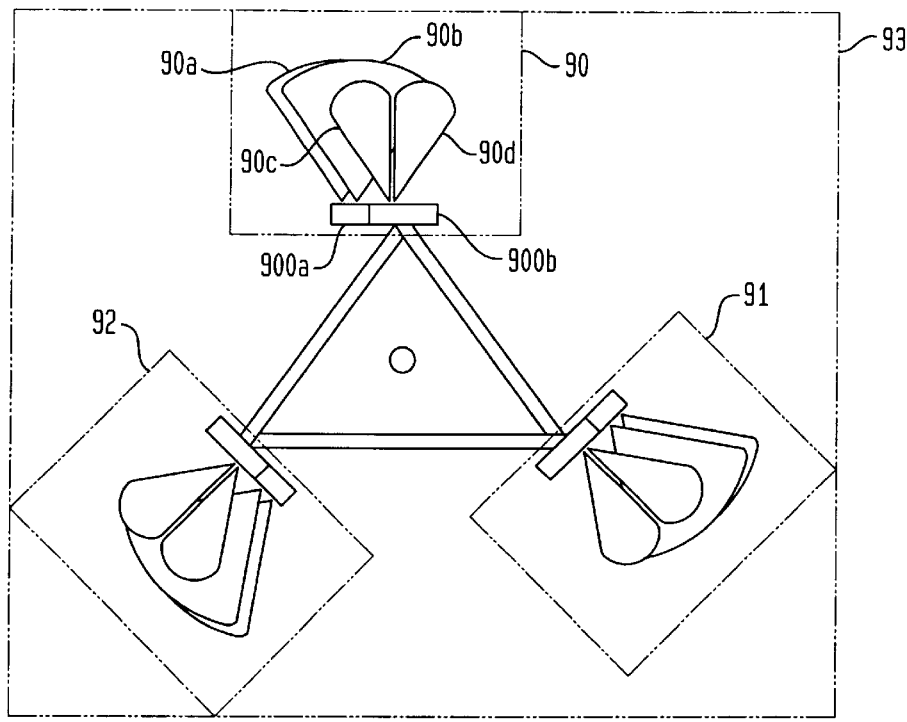
FIG. 11 illustrates a representative diagram of a three sector cell which can be achieved using the invention and which implements dual polarization packaging.

Referring now to FIG. 11, a representative diagram of a three sector cell 93 is shown which uses the four port system shown in FIG. 6 for the transmitter/receiver system, but uses an antenna configuration of one combined radome 900*a*, 900*b*, per sector. The radomes 900*a*, 900*b* are implemented in such a way as to provide the beam pattern shown in FIG. 11, as well as cross polarization. As it is well known in the art, cross polarization can be achieved using dual slant antennas, vertical/horizontal antennas, or dual circular antennas. This implementation is known in the art as dual polarization packaging.

As can be seen in FIG. 11, the two concurrent beam patterns 90*a*, 90*b* are generated with radome 900*a*, wherein concurrent beam patterns 90a, 90b are cross-polarized. This dual polarization packaging makes it possible for the two concurrent beam patterns 90a, 90b to be packaged in one radome 900a, in a small space, while also achieving the independence required for diversity processing. The two sub-sector beam patterns 90c, 90d are generated with radome 900b. As should be readily apparent, the antenna configuration for sectors 91 and 92 is identical to that of sector 90.

Figure 12:
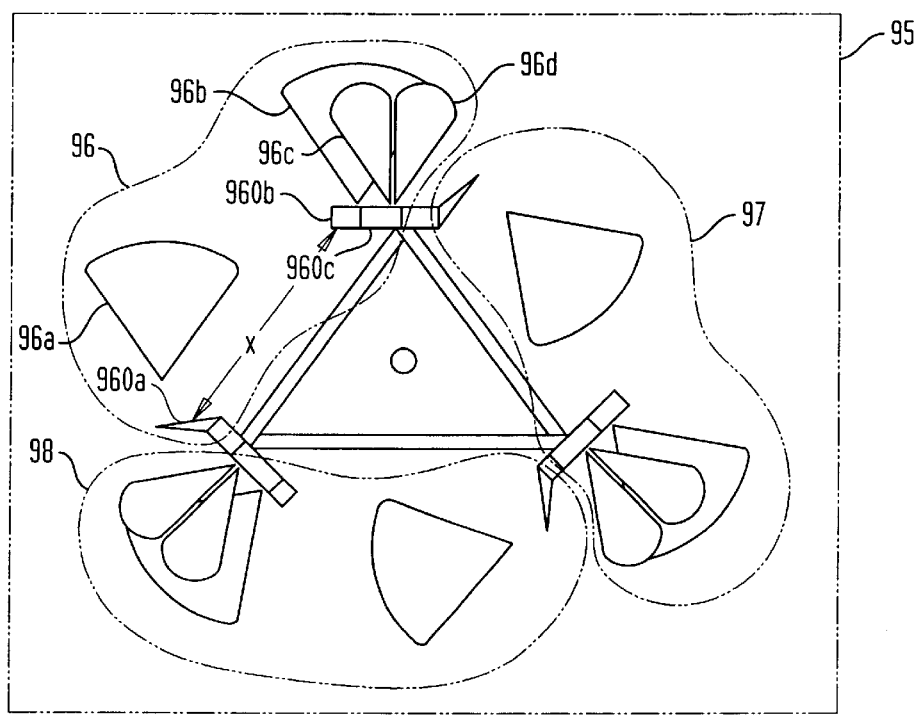
FIG. 12 illustrates a representative diagram of a three sector cell which can be achieved using the invention and which implements horizontal spatial packaging.

Referring now to FIG. 12, a representative diagram of a three sector cell 95 is shown which employs a specific implementation of the transmitter/receiver system in accordance with a modification of the first embodiment of the invention. This implementation differs from the FIGS. 5, 6 embodiment in that one combined radome 960b, 960c and one separate radome 960a are used per sector. The combined radome 960b, 960b houses antenna elements used to form one of the concurrent beam patterns 96b and the two sub-sector beam patterns 96c, 96d, respectively. The other radome 960a houses the antenna elements that form the other concurrent beam pattern 96a for that sector 96. This implementation is known in the art as horizontal spatial packaging.

As can be seen in FIG. 12, the two radomes 960a, 960b are separated by a horizontal distance x, where x can be any value. It is this spatial distance x which achieves the independence required for diversity processing. As should be readily apparent, the antenna configuration for sectors 97 and 98 is identical to that of sector 96.

The present invention combines concurrent beam patterns and sub-sector beam patterns for the uplink receiver function, and processes the positional information received from the uplink sub-sector beams to determine which sub-sector beam(s) will serve the downlink transmit function. This is achieved with antenna installations very similar to those currently being used in the art without the need for additional active or passive components being tower mounted, thus making the implementation of the invention practical at low cost.

While preferred embodiments of the invention have been described and illustrated, it should be apparent that many modifications can be made to the invention without departing from its spirit or scope. Accordingly, the invention is not limited by the foregoing description or drawings, but is only limited by the scope of the appended claims.

What is claimed as new and desired to be protected by Letters Patent of the United States is:

1. A transmitter/receiver system comprising:
   a first plurality of antenna ports adapted to be coupled to respective antennas having an associated beam pattern that covers an entire sector;
   a second plurality of antenna ports adapted to be coupled to respective antennas having an associated beam pattern that covers a sub-sector;
   receiver signal processing circuitry for receiving and processing uplink RF signals received from each of said first and second plurality of antenna ports; and
   transmitter signal processing circuitry for providing downlink RF signals to at least one port of said second plurality of ports.

2. The system as in claim 1, wherein said receiver signal processing circuitry performs adaptive array processing on said uplink RF signal.

3. The system as in claim 1, wherein said transmitter signal processing circuitry includes a switching device for providing said downlink RF signals to a selected said at least one port of said second plurality of ports.

4. The system as in claim 1, wherein said receiver signal processing circuitry comprises:
   a plurality of frequency duplexers, each of said frequency duplexers being respectively coupled to one of said second plurality of antenna ports;
   an adaptive array diversity receiver comprising a plurality of receiver branches, each input of a first subset of said plurality of receiver branches being respectively coupled to an output of one of said plurality of frequency duplexers, each input of a second subset of said plurality of receiver branches being respectively coupled to one of said first plurality of antenna ports;
   an adaptive array processor, said processor being coupled to an output of each of said plurality of receiver branches; and
   a receiver coupled to an output of said adaptive array processor.

5. The system as in claim 1, wherein said transmission signal processing circuitry comprises:
   a transmitter;
   a transmitter selector switch, said switch comprising a plurality of output positions, said switch having an input coupled to an output of said transmitter; and
   a plurality of frequency duplexers, each of said frequency duplexers being respectively coupled to one of said output positions of said selector switch, each of said frequency duplexers also being respectively coupled to one of said second plurality of antenna ports.

6. The system as in claim 5, further comprising a plurality of amplifiers, an input of each of said plurality of amplifiers being respectively coupled to one of said plurality of output positions of said selector switch, an output of each of said plurality of amplifiers being respectively coupled to one of said plurality of frequency duplexers.

7. The system as in claim 5, wherein said selector switch selects one of said output positions in response to a control signal received from said receiver signal processing circuitry.

8. The system as in claim 1, wherein said receiver signal processing circuitry and said transmitter signal processing circuitry are part of a cellular base station.

9. A system for transmitting and receiving RF signals comprising:
   at least four antenna ports connectable to respective antennas and used in an uplink signal processing function, at least a first two of said respective antennas having an associated beam pattern that covers an entire sector, at least a second two of said respective antennas having an associated beam pattern that covers a sub-sector, wherein said at least a second two of said at least four antenna ports are also used in a downlink signal processing function; and
   transmitter/receiver processing circuitry coupled to said at least four antenna ports and operating to provide downlink RF signals to said at least a second two antenna ports and for receiving and processing uplink RF signals received at said at least four antenna ports.

10. The system as in claim 9, wherein said transmitter/receiver circuitry comprises:
    at least two frequency duplexers, each of said at least two frequency duplexers being respectively coupled to one of said at least four antenna ports;
    an adaptive array diversity receiver comprising at least four receiver branches, each input of a first at least two of said at least four receiver branches being respectively coupled to an output of one of said at least two frequency duplexers, each input of a second at least two of said at least four receiver branches being respectively coupled to a remaining one of said at least four antenna ports;

an adaptive array processor, said processor being coupled to an output of each of said at least four receiver branches; and a receiver coupled to an output of said adaptive array processor.

11. The system as in claim 10 further comprising:

a transmitter; and a transmitter selector switch, comprising at least two output positions, having an input coupled to an output of said transmitter, said transmitter selector switch being controlled by an output of said adaptive array processor, each of said at least two output positions of said transmitter selector switch also being respectively coupled to one of said at least two frequency duplexers.

12. The system as in claim 11 further comprising at least two amplifiers, an input of each of said at least two amplifiers being respectively coupled to one of said at least two output positions of said transmitter selector switch, an output of each of said at least two amplifiers also being respectively coupled to one of said at least two frequency duplexers.

13. The system as in claim 9, wherein said system is used in a cellular base station.

14. The system as in claim 13, wherein the antenna system of said cellular base station uses horizontal spatial packaging.

15. The system as in claim 13, wherein the antenna system of said cellular base station uses dual polarization packaging.

16. A method of transmitting and receiving RF signals at a base station comprising:

receiving uplink RF signals and passing said signals through a plurality of antenna ports connectable to respective antennas, a first sub-set of said respective antennas having an associated beam pattern that covers an entire sector, a second sub-set of said respective antennas having an associated beam pattern that covers a sub-sector;

processing said uplink RF signals passed by said plurality of antenna ports with receiver signal processing circuitry;

selecting at least one port connectable to said second sub-set of respective antennas to pass downlink RF signals; and transmitting said downlink RF signals by passing said RF signals through at least said one selected port.

17. The method as in claim 16, wherein said act of processing further comprises adaptive array processing of said uplink RF signals.

18. The method as in claim 16, wherein said act of selecting further comprises switching between at least two ports respectively connectable to at least two of said second sub-set of antennas to pass said downlink RF signals.

19. The method as in claim 16, wherein said base station is a cellular base station.

20. The method as in claim 16, wherein said act of processing further comprises:

sending uplink RF signals, passed by each of said plurality of antenna ports connectable to said second sub-set of respective antennas, through frequency duplexing circuitry;

sending uplink RF signals, passed by each of a remainder of said plurality of antenna ports connectable to said first sub-set of respective antennas, through receiver processing circuitry;

sending said uplink RF signals, passed through said frequency duplexing circuitry, through said receiver processing circuitry; and passing said uplink RF signals from said receiver processing circuitry into a receiver.

21. The method as in claim 20, further comprising controlling the selection of said at least one port connectable to said second sub-set of respective antennas by an output signal of said receiver processing circuitry.

22. The method as in claim 16, wherein said act of transmitting further comprises:

selecting at least one signal path, from a plurality of signal paths, for radiating downlink RF signals;

radiating downlink RF signals through said selected at least one signal path;

passing said radiated downlink RF signals through frequency duplexing circuitry; and passing said radiated downlink RF signals through said at least one selected port.

23. The method as in claim 22, wherein said radiated downlink RF signals are also passed through signal amplification circuitry.

24. A method of transmitting and receiving RF signals at a base station comprising:

receiving uplink RF signals and passing said signals through at least four antenna ports connectable to respective antennas, at least a first two of said respective antennas having an associated beam pattern that covers an entire sector, at least a second two of said respective antennas having an associated beam pattern that covers a sub-sector;

processing said uplink RF signals passed by said at least four antenna ports with receiver signal processing circuitry;

selecting at least one port connectable to at least one said at least a second two antennas which will serve to pass downlink RF signals; and transmitting said downlink RF signals by passing said RF signals through said at least one selected port.

25. The method as in claim 24, wherein said act of processing further comprises adaptive array processing of said uplink RF signals.

26. The method as in claim 24, wherein said act of selecting further comprises switching between at least two ports respectively connectable to said at least a second two antennas.

27. The method as in claim 24, wherein said act of processing further comprises:

sending each of said uplink RE signals, received by said at least one port, through frequency duplexing circuitry;

sending each of a remainder of said uplink RF signals, passed by said at least four antenna ports, through receiver processing circuitry;

sending each of said uplink RF signals, passed through frequency duplexing circuitry, through said receiver processing circuitry; and passing said uplink RF signals to receiver circuitry.

28. The method as in claim 27, wherein a selection signal is sent from said receiver processing circuitry to select said at least one port.

29. The method as in claim 24, wherein said act of transmitting further comprises:
selecting at least one signal path for radiating downlink RF signals;
radiating downlink RF signals through said selected at least one signal path;
passing said radiated downlink RF signals through frequency duplexing circuitry; and
passing said radiated downlink RF signals through said at least one selected port.

30. The method as in claim 29, wherein said radiated downlink signals are passed through signal amplification circuitry.

31. The method as in claim 24, wherein said base station is a cellular base station.

32. A transmitter/receiver system comprising:
a first plurality of antenna ports adapted to be coupled to respective antennas having an associated first predetermined beam pattern;
a second plurality of antenna ports adapted to be coupled to respective antennas having an associated second predetermined beam pattern;
receiver signal processing circuitry for receiving and processing uplink RF signals received from each of said first and second plurality of antenna ports; and
transmitter signal processing circuitry for providing downlink RF signals to at least one port of said second plurality of ports, wherein
said receiver signal processing circuitry further comprises:
a plurality of frequency duplexers, each of said frequency duplexers being respectively coupled to one of said second plurality of antenna ports;
an adaptive array diversity receiver comprising a plurality of receiver branches, each input of a first subset of said plurality of receiver branches being respectively coupled to an output of one of said plurality of frequency duplexers, each input of a second subset of said plurality of receiver branches being respectively coupled to one of said first plurality of antenna ports;
an adaptive array processor, said processor being coupled to an output of each of said plurality of receiver branches; and
a receiver coupled to an output of said adaptive array processor.

33. A transmitter/receiver system comprising:
a first plurality of antenna ports adapted to be coupled to respective antennas having an associated first predetermined beam pattern;
a second plurality of antenna ports adapted to be coupled to respective antennas having an associated second predetermined beam pattern;
receiver signal processing circuitry for receiving and processing uplink RF signals received from each of said first and second plurality of antenna ports; and
transmitter signal processing circuitry for providing downlink RF signals to at least one port of said second plurality of ports, wherein
said transmission signal processing circuitry further comprises:
a transmitter;
a transmitter selector switch, said switch comprising a plurality of output positions, said switch having an input coupled to an output of said transmitter; and
a plurality of frequency duplexers, each of said frequency duplexers being respectively coupled to one of said output positions of said selector switch, each of said frequency duplexers also being respectively coupled to one of said second plurality of antenna ports.

34. The system as in claim 33 further comprising a plurality of amplifiers, an input of each of said plurality of amplifiers being respectively coupled to one of said plurality of output positions of said selector switch, an output of each of said plurality of amplifiers being respectively coupled to one of said plurality of frequency duplexers.

35. The system as in claim 33, wherein said selector switch selects one of said output positions in response to a control signal received from said receiver signal processing circuitry.

36. A system for transmitting and receiving RF signals comprising:
at least four antenna ports connectable to respective antennas and used in an uplink signal processing function, at least two of said at least four antenna ports also being used in a downlink signal processing function; and
transmitter/receiver processing circuitry coupled to said at least four antenna ports and operating to provide downlink RF signals to said at least two antenna ports and for receiving and processing uplink RF signals received at said at least four antenna ports, wherein
said transmitter/receiver circuitry further comprises:
at least two frequency duplexers, each of said at least two frequency duplexers being respectively coupled to one of said at least four antenna ports;
an adaptive array diversity receiver comprising at least four receiver branches, each input of a first at least two of said at least four receiver branches being respectively coupled to an output of one of said at least two frequency duplexers, each input of a second at least two of said at least four receiver branches being respectively coupled to a remaining one of said at least four antenna ports;
an adaptive array processor, said processor being coupled to an output of each of said at least four receiver branches; and
a receiver coupled to an output of said adaptive array processor.

37. The system as in claim 36 further comprising:
a transmitter; and
a transmitter selector switch, comprising at least two output positions, having an input coupled to an output of said transmitter, said transmitter selector switch being controlled by an output of said adaptive array processor, each of said at least two output positions of said transmitter selector switch also being respectively coupled to one of said at least two frequency duplexers.

38. The system as in claim 37 further comprising at least two amplifiers, an input of each of said at least two amplifiers being respectively coupled to one of said at least two output positions of said transmitter selector switch, an output of each of said at least two amplifiers also being respectively coupled to one of said at least two frequency duplexers.

39. A method of transmitting and receiving RF signals at a base station comprising:
receiving uplink RF signals and passing said signals through a plurality of antenna ports adapted to be coupled to respective antennas;

processing said uplink RF signals passed by said plurality of antenna ports with receiver signal processing circuitry;

selecting at least one port of a sub-set of said plurality of antenna ports to pass downlink RF signals; and transmitting said downlink RF signals by passing said RF signals through at least said one selected port, wherein said act of processing further comprises:

sending uplink RF signals, passed by each of said sub-set of said plurality of antenna ports, through frequency duplexing circuitry;

sending uplink RF signals, passed by each of the remaining of said plurality of antenna ports, through receiver processing circuitry;

sending said uplink RF signals, passed through said frequency duplexing circuitry, through said receiver processing circuitry; and passing said uplink RF signals from said receiver processing circuitry into a receiver.

40. The method as in claim 39, further comprising controlling the selection of at least one port of said sub-set of ports to pass said downlink RF signals by an output signal of said receiver processing circuitry.

41. A method of transmitting and receiving RF signals at a base station comprising:

receiving uplink RF signals and passing said signals through a plurality of antenna ports adapted to be coupled to respective antennas;

processing said uplink RF signals passed by said plurality of antenna ports with receiver signal processing circuitry;

selecting at least one port of a sub-set of said plurality of antenna ports to pass downlink RF signals; and transmitting said downlink RF signals by passing said RF signals through at least said one selected port, wherein said act of transmitting further comprises:

selecting at least one signal path, from a plurality of signal paths, for radiating downlink RF signals;

radiating downlink RF signals through said selected at least one signal path;

passing said radiated downlink RF signals through frequency duplexing circuitry; and passing said radiated downlink RF signals through said selected at least one port of said sub-set of said plurality of ports.

42. The method as in claim 41, wherein said radiated downlink RF signals are also passed through signal amplification circuitry.

43. A method of transmitting and receiving RF signals at a base station comprising:

receiving uplink RF signals and passing said signals through at least four antenna ports adapted to be coupled to respective antennas;

processing said uplink RF signals passed by said at least four antenna ports with receiver signal processing circuitry;

selecting at least one port of said at least four antenna ports which will serve to pass downlink RF signals; and transmitting said downlink RF signals by passing said RF signals through said at least one port of said at least four antenna ports, wherein said act of processing further comprises:

sending each of said uplink RF signals, received by said at least one port, through frequency duplexing circuitry;

sending each of a remainder of said uplink( RF signals, passed by said at least four antenna ports, through receiver processing circuitry;

sending each of said uplink RF signals, passed through frequency duplexing circuitry, through said receiver processing circuitry; and passing said uplink RF signals to receiver circuitry.

44. The method as in claim 43, wherein a selection signal is sent from said receiver processing circuitry to select at least one port of said at least four ports to pass said downlink RF signals.

45. A method of transmitting and receiving RF signals at a base station comprising:

receiving uplink RF signals and passing said signals through at least four antenna ports adapted to be coupled to respective antennas;

processing said uplink RF signals passed by said at least four antenna ports with receiver signal processing circuitry;

selecting at least one port of said at least four antenna ports which will serve to pass downlink RF signals; and transmitting said downlink RF signals by passing said RF signals through said at least one port of said at least four antenna ports, wherein said act of transmitting further comprises:

selecting at least one signal path for radiating downlink RF signals;

radiating downlink RF signals through said selected at least one signal path;

passing said radiated downlink RF signals through frequency duplexing circuitry; and passing said radiated downlink RF signals through said selected at least one port of said at least four ports.

46. The method as in claim 45, wherein said radiated downlink signals are passed through signal amplification circuitry.

* * * * *